(12) United States Patent
Flik et al.

(10) Patent No.: US 10,576,729 B2
(45) Date of Patent: Mar. 3, 2020

(54) DEVICE AND METHOD FOR PRODUCING THREE-DIMENSIONAL OBJECTS

(71) Applicants: HOMAG GMBH, Schopfloch (DE); WEEKE BOHRSYSTEME GMBH, Herzebrock-Clarholz (DE)

(72) Inventors: Markus Flik, Stuttgart (DE); Thomas Bettermann, Bielefeld (DE)

(73) Assignees: HOMAG GMBH, Schopfloch (DE); WEEKE BOHRSYSTEME GMBH, Herzebrock-Clarholz (DE)

( * ) Notice: Subject to any disclaimer, the term of this patent is extended or adjusted under 35 U.S.C. 154(b) by 258 days.

(21) Appl. No.: 15/302,110

(22) PCT Filed: Apr. 7, 2015

(86) PCT No.: PCT/EP2015/057468
§ 371 (c)(1),
(2) Date: Oct. 5, 2016

(87) PCT Pub. No.: WO2015/155164
PCT Pub. Date: Oct. 15, 2015

(65) Prior Publication Data
US 2017/0113408 A1    Apr. 27, 2017

(30) Foreign Application Priority Data
Apr. 7, 2014   (DE) .................. 10 2014 206 697

(51) Int. Cl.
*B29C 64/188*    (2017.01)
*B33Y 80/00*    (2015.01)
(Continued)

(52) U.S. Cl.
CPC ............... *B33Y 80/00* (2014.12); *B27N 5/00* (2013.01); *B28B 1/001* (2013.01); *B29C 64/00* (2017.08);
(Continued)

(58) Field of Classification Search
CPC .... B29C 64/357; B29C 64/188; B29C 64/194
See application file for complete search history.

(56) References Cited

U.S. PATENT DOCUMENTS

| 6,284,838 B1 | 9/2001 | Silbiger |
| 2002/0041818 A1 | 4/2002 | Abe et al. |
(Continued)

FOREIGN PATENT DOCUMENTS

| DE | 4422146 A1 | 1/1996 |
| DE | 19533960 A1 | 3/1997 |
(Continued)

OTHER PUBLICATIONS

International Search Report dated Sep. 1, 2015 with respect to international application No. PCT/EP2015/057468—cited only for references that are disclosed therein.
(Continued)

*Primary Examiner* — Timothy Kennedy
(74) *Attorney, Agent, or Firm* — Scott R. Cox (57) ABSTRACT

The present invention is a device and a method for producing three-dimensional objects. Said three-dimensional objects may be items used in furniture and component manufacturing. The device includes a machining tool for the machining of workpieces by material removal, a feed mechanism for supplying an additional material, such as a wood material, such as foamed wood, wood flour, sawdust or the like, a metal or mineral paste, or plastic, and an application unit for forming three-dimensional objects from the material supplied by the feed mechanism.

12 Claims, 7 Drawing Sheets

(51) Int. Cl.
| | |
|---|---|
| *B29C 64/00* | (2017.01) |
| *B29C 64/35* | (2017.01) |
| *B29C 64/124* | (2017.01) |
| *B29C 64/194* | (2017.01) |
| *B33Y 10/00* | (2015.01) |
| *B33Y 30/00* | (2015.01) |
| *B33Y 40/00* | (2020.01) |
| *B27N 5/00* | (2006.01) |
| *B28B 1/00* | (2006.01) |
| *B29K 105/00* | (2006.01) |

(52) U.S. Cl.
CPC .......... *B29C 64/124* (2017.08); *B29C 64/188* (2017.08); *B29C 64/194* (2017.08); *B29C 64/35* (2017.08); *B33Y 10/00* (2014.12); *B33Y 30/00* (2014.12); *B33Y 40/00* (2014.12); *B29K 2105/007* (2013.01)

(56) References Cited

U.S. PATENT DOCUMENTS

| | | | |
|---|---|---|---|
| 2002/0090410 A1* | 7/2002 | Tochimoto | B29C 64/165 |
| | | | 425/215 |
| 2003/0062655 A1 | 4/2003 | Lohner et al. | |
| 2004/0089980 A1 | 5/2004 | Owada | |
| 2005/0247216 A1* | 11/2005 | Reichwein | B41J 3/407 |
| | | | 101/32 |
| 2008/0280028 A1* | 11/2008 | Albrecht | B41J 3/28 |
| | | | 427/8 |
| 2013/0108726 A1 | 5/2013 | Uckelmann et al. | |
| 2015/0290741 A1* | 10/2015 | Abe | B29C 64/153 |
| | | | 264/497 |

FOREIGN PATENT DOCUMENTS

| | | |
|---|---|---|
| DE | 102011015068 A1 | 9/2012 |
| EP | 2196267 A2 | 6/2010 |
| EP | 2636512 A2 | 9/2013 |
| JP | 2006247989 A | 9/2006 |
| WO | WO2013180609 A1 | 12/2013 |

OTHER PUBLICATIONS

Canale di CNCmachinable, "Multiax CNC paste extrusion", (Mar. 9, 2012), YouTube, URL: https://www.youtube.com/watch?v=4Af8S-suDaU,(Jun. 4, 2015),XP054975903[X] 1,2,4-6,8-14 *see entire video*.

German Search Report dated Mar. 18, 2015 with respect to parallel German patent application No. 10 2014 206 697.2—cited only for references that are disclosed therein.

European Examination Report dated Nov. 6, 2019 with respect to parallel European patent application No. 15 714 808.1—cited only for references that are disclosed therein.

* cited by examiner

DEVICE AND METHOD FOR PRODUCING THREE-DIMENSIONAL OBJECTS

TECHNICAL FIELD

The present invention relates to a device and to a method for producing three-dimensional objects. Said three-dimensional objects may, in particular, be items used in furniture and component manufacturing.

PRIOR ART

WO 2013/180609 A1 is known, which relates to a method and to a device for the layer-by-layer forming of an object. The layer-by-layer forming of objects falls into the area of generative methods and can be assigned to what is known as 3D printing.

Within the framework of said method a mass element, a binder and at least one reinforcing element are used. The mass element can be, for example, wood dust. Wood chippings arising from the processing of wood, sawdust or planing shavings can also be used. The use of wood dust is advantageous, because wood dust is available at low cost. Environmental aspects also play a role here, as biodegradable material is considerably more environment-friendly than other materials used in 3D printing, such as synthetic resins. Wood glue can also be used as binder in the method stated here.

The articles that can be manufactured by way of the known method relate also to items from the furniture industry, e.g. shelves, tables or chairs.

As a further document, U.S. Pat. No. 6,284,838 A1 shows a biodegradable composition consisting of lignin or a lignin-containing material and a protein. The lignin or lignin-containing material is heated and melted together with the protein. Fine wood particles may be used as lignin-containing material.

Furthermore, EP 2 636 512 A2 is known, which relates to a method for the layer-by-layer construction of a shaped body made of a material that hardens. Wood glue and other natural-based binding agents are available for this. Wood flour might also be a suitable filling material in certain circumstances.

DE 2011 015 068 A1 shows a device and a method for the layer-by-layer construction of a sample product or serial product. Preferably a light foam fraction of defined particle size and defined density in the form of small beads is envisaged as filler. Inorganic substances such as wood or cellulose are, however, also suitable as fillers.

SUBJECT—MATTER OF THE INVENTION

It is an object of the present invention to provide a device and a method in order to promote the industrial applicability of a generative method and enable a cost-effective implementation.

To this end, the present invention provides a device according to Claim 1 and a method according to Claim 11. Further preferred embodiments are set out in the dependent claims.

"Application unit" within the meaning of this application relates to any device with which a generative method for the forming of three-dimensional objects can be performed. For example, a powdery starting material is applied in a layer and is bonded or melted with a layer underneath it with an input of energy in defined areas.

In this context, the term "three-dimensional object" is to be understood as a structural object, the dimensions of which go beyond a coating consisting of a liquid or solid coating material or a printed surface. In particular the three-dimensional object should have a thickness of at least 500 µm.

In a preferred embodiment the additional material for the forming of three-dimensional objects is lignin-containing material such as wood material, in particular foamed wood, wood flour, sanding dust, sawdust, cellulose or the like. Furthermore the additional material can be metal pastes or foams, plastic pastes or foams, concrete material, or electrically conducting materials such as copper paste or an electrically conducting plastic. A further alternative is a material that contains carbon fibre. Furthermore thermoplastic, thermoset, elastomeric plastics can be used. However, the present invention is not limited to the use of a certain type of material. The forming of a three-dimensional object can also take place in sections with different materials, or the materials are mixed before being applied. In further embodiments the utilisation of aluminium foam, plastic foam etc. is envisaged as material for the forming of three-dimensional objects, in particular for the forming of lightweight boards.

In one embodiment the device comprises a storage device, which is connected to the feed mechanism, to accommodate the material.

Particularly preferably the storage device is a preparation unit, in which the additional material to be processed with an application unit is prepared for processing and stored temporarily. In this case the preparation can relate to the mixing of two components. For example, a mixture of wood and aluminium can be created, or a dye, size, hardener and/or an activating component is mixed into the base material. Said activating component is stimulated through the introduction of energy, e.g. hot air, laser light, UV radiation. In the process the base material or an adhesive agent that is likewise mixed in is melted or melted on and develops an adhesive effect. In this way the additional material is prepared and can be supplied for processing.

In a further embodiment the device comprises furthermore a coating device, in particular an inkjet printing device, with which workpieces and/or shapes formed by the application unit can be printed, painted or varnished. In this way a workpiece or component part manufactured by means of the application unit can be postmachined in a machine.

Furthermore the device can comprise a finishing unit, in particular a heating device, a UV radiator, a device for edge-banding, extruding and coating, laminating, cleaning, degreasing, improving the adhesive and wetting properties and reducing the electrostatic charge. Thus the surface and depth properties of workpieces and component parts manufactured by means of the application unit can be optimised in a targeted way.

Additionally or alternatively there can be assigned to the application unit a pretreatment module, with which a workpiece serving as base workpiece is subjected to one or more pretreatment steps, wherein the pretreatment module preferably has one or more modules selected from a precleaning module, a degreasing module, a module to improve the adhesive and wetting properties and a module to reduce the electric charge. In this way the quality claims can be influenced positively.

In a modification the device comprises an embossing plate, with which the three-dimensional object formed by means of the application unit is given a structure. This will be done by means of pressure, perhaps in combination with an input of heat.

The application unit can be moved preferably along an, in particular, linear guide, preferably horizontally and vertically. This increases the possible uses of the application unit considerably.

Furthermore the application unit itself can comprise a storage facility, which accommodates the additional material that is to be processed. This storage facility can be envisaged alternatively or additionally to the previously mentioned storage facility. It is also possible to fill the storage facility continuously with the additional material via a feed channel or in a time cycle.

In a particularly preferred variant the application unit is attachable to a tool holder, in particular from a tool store. The tool holder can be a spindle unit, to which usually a machining tool such as a milling cutter is attached. Thus the application unit can be treated like a machining tool such as a milling cutter.

If the application unit is stored temporarily in a tool store/magazine, a machining tool or the application unit can be used alternatively in the tool holder. This extends the potentials of the device radically.

In a further variant the machining tool and the application unit are attached to a shared carriage, which can be moved along the guide.

Alternatively it is possible to attach the machining tool and the application unit on separate carriages on a shared jib or portal.

Furthermore the present invention relates to a method for the forming of three-dimensional objects using a device, where the device has a machining tool for the machining of workpieces, preferably by material removal, in particular by cutting, a supply mechanism for supplying an additional material, and an application unit, in which method a three-dimensional object is formed from the material by means of the application unit and machining is performed by means of the machining tool.

PREFERRED EMBODIMENTS OF THE PRESENT INVENTION

Preferred embodiments of the present invention are explained in detail below with the help of the attached figures. Individual features or modifications of the respective embodiments can each be combined with other embodiments, in order to form new developments of the present invention.

Figure 1:
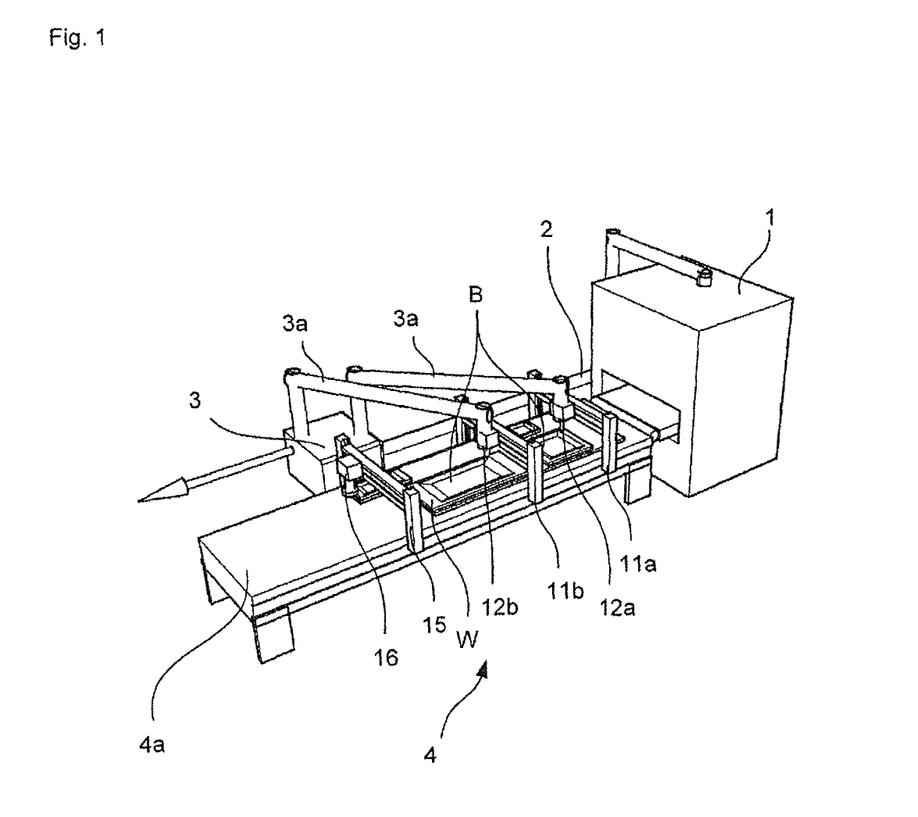
FIG. 1 is a perspective view of a first embodiment of the present invention.
Figure 2:
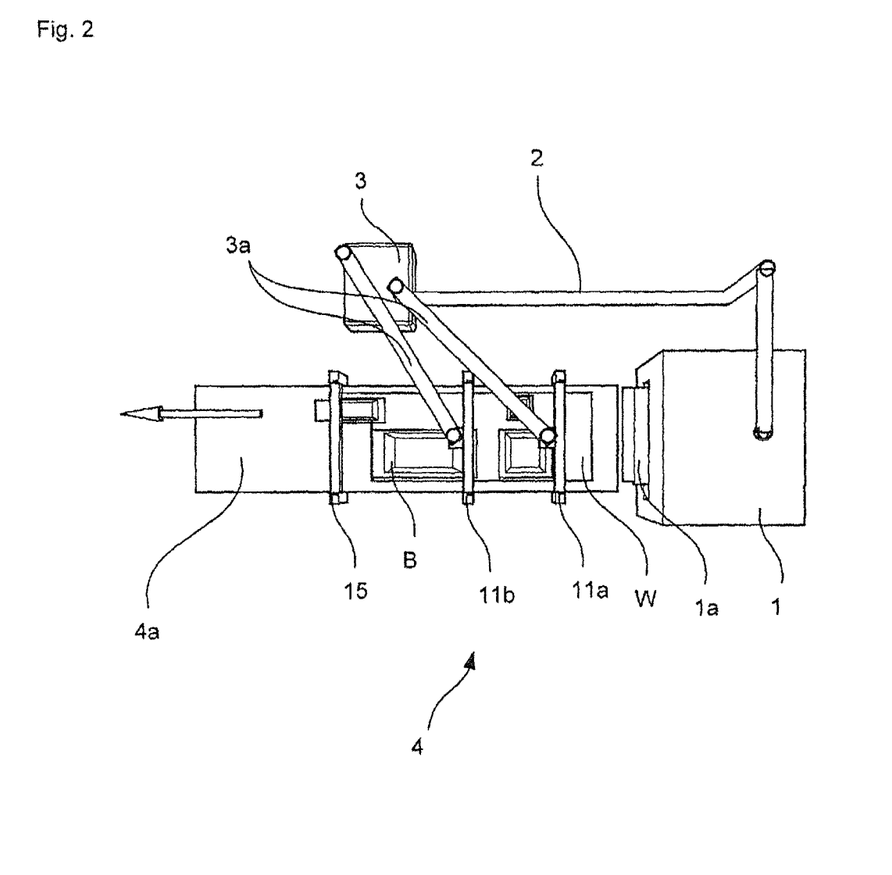
FIG. 2 is a top view of the first embodiment of the present invention represented in FIG. 1.
Figure 3:
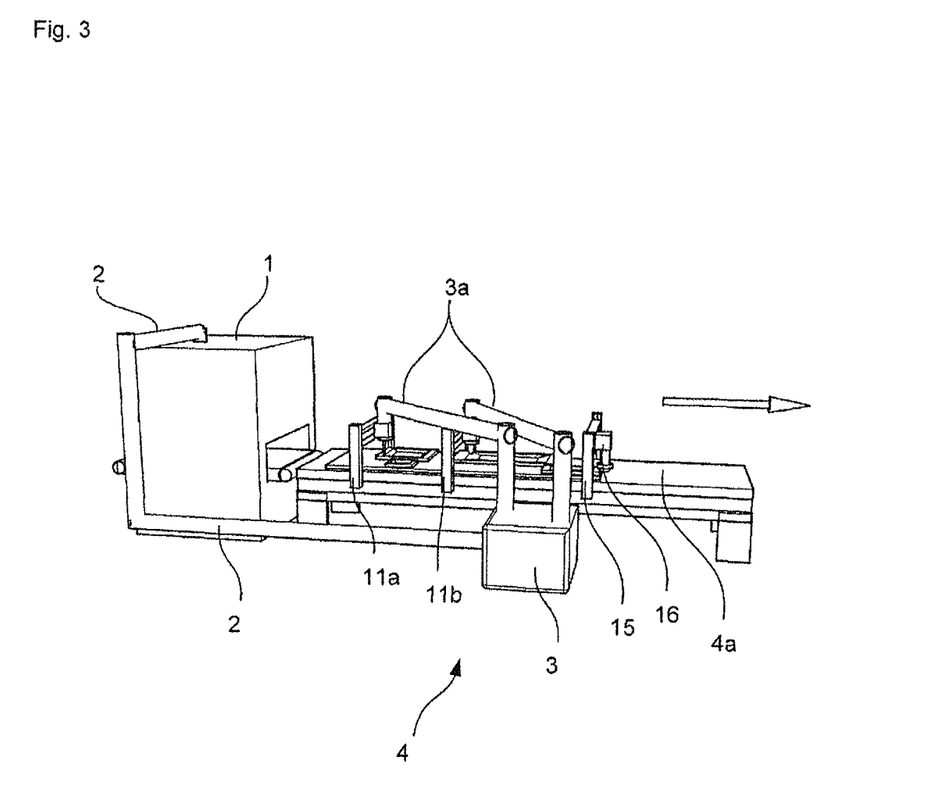
FIG. 3 is a further representation of the first embodiment.

FIGS. 1-3 show a first embodiment of the present invention. This is formed as a production line and comprises a sanding machine 1 and also a device 4 for the forming of three-dimensional objects. The direction of movement of the workpieces is indicated in FIGS. 1-4 by means of an arrow.

On the charging side of the production line there is the sanding machine 1, which comprises a conveyor belt 1a, with which a workpiece W is conveyed through the sanding machine 1. During machining of the top and/or bottom side of the workpiece W the sanding machine 1 produces sanding dust, which is removed from the workpiece and/or from the sanding belt via a suction device envisaged in the sanding machine 1.

Downstream, in the flow direction of the sanding machine 1, there is the device 4 for the forming of three-dimensional objects. This comprises a workpiece-accommodating surface 4a, which, for example, is formed likewise as conveyor belt. In this connection the workpiece-accommodating surface 4a is envisaged essentially in the same, horizontally aligned plane as the conveyor belt 1a of the sanding machine 1.

The sanding dust extracted by means of a suction device in the sanding machine 1 is carried from the sanding machine 1 to a preparation unit 3 (storage device) by way of an extraction duct 2. The preparation unit 3 is disposed next to the device 4 and serves to store temporarily (buffer) the sanding dust fed through the extraction duct 2. Furthermore the preparation unit 3 can comprise means with which the sanding dust is prepared.

Such preparation devices include, for example, a cleaning device for filtering material fractions which are removed from the workpiece W during the sanding procedure, but which cannot be utilised for the subsequent machining (e.g. flakes of paint, lubricant, remains of adhesive or the like). It is also possible for abrasive grit from the sanding belts or for contaminants present in the surroundings to be able to enter the extraction duct 2 and these should likewise be separated from the wood material of the sanding dust.

However, it should be pointed out that such cleaning devices might not be necessary, if a relatively pure wood-based material is already fed into the preparation unit 3. In this case the "preparation" of the sanding dust includes primarily its temporary storage before further processing.

In the case of wood material it is also possible for different wood materials to be mixed in the preparation unit 3. Thus a proportion of recycled material and a proportion of new material can be provided. Furthermore the mixing of different types of wood can be envisaged for certain visual requirements.

Furthermore in one variant of the described embodiment the preparation unit 3 can comprise a device with which further components are mixed in with the material fed into the preparation unit 3. In this way a combination of materials is provided.

The at least one component added in the preparation unit 3 in this case is a material that differs from the other material (here: wood material). For example, a mixture of wood and aluminium or a mixture of wood and carbon fibre can be created, or a dye, size, hardener and/or an activating component is mixed into the base material.

Said activating component is put into the active state through the introduction of energy, e.g. hot air, laser light, UV radiation. When this happens, the base material or an adhesive agent that is likewise mixed in is melted or melted on and can thereafter harden.

The added component may be introduced into the preparation unit in the form of granules, in the form of dust particles, in the form of threads or also as a liquid. Furthermore it is possible to introduce the component that is to be added into the preparation unit 3 in the gas phase.

The added component can under certain circumstances give off a detectable signal, in particular a visual, physical or chemical signal. This signal can be picked up with a sensor. In this way additional information about the material held in the preparation unit 3 can be transmitted into the product that is being manufactured. Alternatively or additionally the information can also be used in a targeted way during further processing.

The preparation unit 3 is connected with application units 12a, 12b by means of conveying ducts 3a, 3a, which feed the material to be processed (in the present embodiment wood material from sanding dust) from the preparation unit 3 to the appropriate application unit 12a, 12b. The conveying ducts 3a, 3a are flexible hoses, so the manoeuvrability of the application units 12a, 12b is not disturbed.

The application units 12a, 12b are disposed in series in the direction of flow and are guided perpendicularly to the direction of flow on a linear guide of an overarm 11a, 11b constructed as a portal. Advance in the vertical direction is also envisaged.

Disposed downstream of the application units 12a, 12b is a machining tool 16, e.g. a milling cutter or drill bit, which is carried manoeuvrably via an overarm 15. In this connection the machining tool 16 can be moved perpendicularly to the direction of flow along a linear guide of the overarm 15, and can be advanced in the vertical direction.

The overarms 11a, 11b and 15 can both be fastened to the machine bed of the device 4, so as to be stationary, and also be movable along the machine bed of the device 4. (in the direction of flow). Furthermore, the overarms 11a, 11b, 15 can each be constructed as a cantilever instead of as a portal.

An example of a method procedure of the present embodiment is as follows.

To begin with, a workpiece W is introduced into the sanding machine 1 and is moved through the sanding machine 1 by means of the conveyor belt 1a. During this time the top and/or bottom side of the workpiece W is machined with one or more sanding belts, and the sanding dust produced during machining is fed via the preparation unit 3 to the application units 12a, 12b.

The workpiece W reaching the sanding machine 1 serves subsequently as base plate. In this connection three-dimensional structures are formed on the workpiece W by means of the application units 12a, 12b, in particular by means of layer-by-layer application of a wood material.

In parallel or subsequently the workpiece W equipped with the three-dimensional structures is postmachined with the machining tool 16. This relates, for example, to the introduction of drilled holes or machining-off of the material applied by the application units 12a, 12b, in order to form radii or other structures in this area. Thereupon the workpiece W thus equipped with three-dimensional structures can be removed from the device 4.

In FIGS. 1-3 said three-dimensional structures are given the reference character B, as it is evident that, instead of the workpiece W, individual component parts B (three-dimensional structures) can be formed by means of the application units 12a, 12b. This can be done with or without base plate.

Furthermore it is evident that the present embodiment is not limited to a certain number of application units 12a, 12b or machining tools 16. Rather the device 4 can comprise only one application unit 12a without a further machining tool 16 being envisaged in the device 4.

A further machining tool can also be disposed before the application unit 12a in the direction of flow, so machining operations can be performed beforehand on the workpiece W which is to be equipped with the three-dimensional structures.

In a further modification of the present embodiment at least one machining tool is disposed before and after the application unit 12a.

Figure 4:
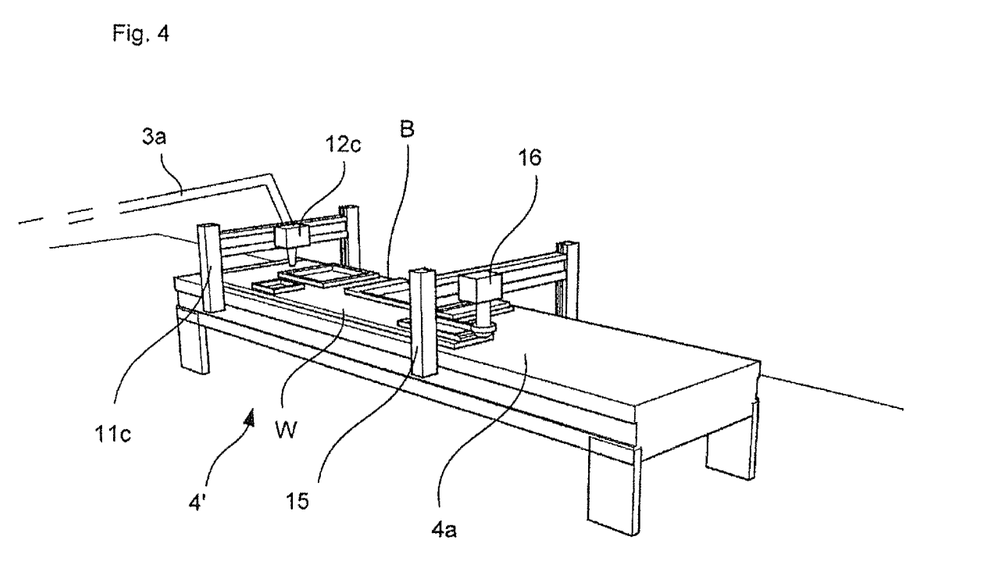
FIG. 4 shows a second embodiment of the present invention.

FIG. 4 shows a second embodiment of the present invention. The device 4' comprises an application unit 12c, which is formed to be manoeuvrable along a linear guide of an overarm 11c constructed as a portal. The application unit 12c can also be moved in the vertical direction.

The application unit 12c is connected with a conveying duct 3a. This feeds a material to be processed (here: wood material) from a preparation unit (storage facility) not represented in FIG. 4. The preparation unit according to the second embodiment can be formed similarly to that represented in the first embodiment. According to the present embodiment, however, no sanding dust produced in prior machining is fed to the preparation unit. Rather the preparation unit is charged with wood chippings, sanding dust, wood scraps and the like in another way.

For example, in a parallel production line sanding dust, wood chippings, wood scraps or the like may be produced, which are to be fed to the device 4' in this second embodiment. Alternatively or additionally manual charging can be envisaged.

The device 4' comprises a workpiece rest 4a, which can be envisaged as conveyor belt for moving the workpieces, as linear conveyor, e.g. as chain or belt conveyor, or, in the case of a workpiece rest where stationary equipment is used, also as a clamping device for stationary holding of workpieces. Especially suitable are, for example, suction clamps or toggle clamps.

To begin with, in the area of a first machining station that comprises the application unit 12c, a component part B is formed with or without base plate (in this regard see also the first embodiment) by feeding wood material via the application unit 12c. This is built up layer by layer, until a component part B with three-dimensional structure is produced.

Thereupon the component part B is moved by means of the conveyor belt 4a into the area of a machining tool 16, which is a chip-removing machining tool, in particular a milling cutter. In the present embodiment the machining tool 16 can be moved along a linear guide on an overarm 15, which overarm 15 is fitted in a portal construction in the vertical direction above the tool rest surface 4a on the machine bed of the device 4' and may perhaps be movable along the device 4'.

Figure 5:
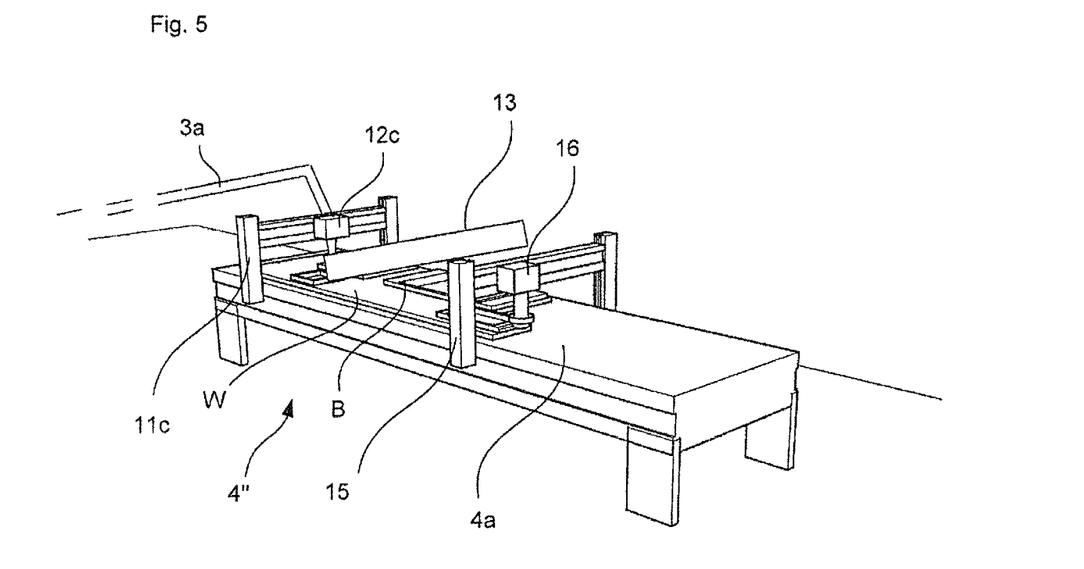
FIG. 5 shows a modification of the second embodiment represented in FIG. 4.

In FIG. 5 a modification of the embodiment represented in FIG. 4 is depicted. According to this embodiment there is envisaged on the device 4", between the overarm 11c with the application unit 12c and the overarm 15 with the machining tool 16, a finishing unit 13, which serves to harden and/or to finish the three-dimensional structure formed by means of the application unit 12c. This can come about, for example, by means of the input of heat or a UV lamp. Also conceivable is a finishing unit which, acting as an embossing plate, exerts pressure on sections of the component part B formed by means of the application unit 12c and/or the workpiece W accommodating the component part B.

Finishing of the workpieces manufactured by means of the application unit 12c can come through the application of a liquid. When this happens, the liquid that is applied can form a layer on the workpieces or penetrate into the formed workpieces and close pores in these workpieces.

Suitable devices for the finishing of workpieces are selected furthermore from edge-banding, extruding and coating, laminating, cleaning, degreasing, improving the adhesive and wetting properties and reducing the electrostatic charge. The types of processing can also be ones that are suitable for preparation and/or posttreatment of the workpieces for printing on these.

Furthermore sanding and keying, priming, corona treatment, plasma treatment, flame treatment and application of adhesion promoters, and also hot-air and hot-gas treatment should be mentioned.

Figure 6:
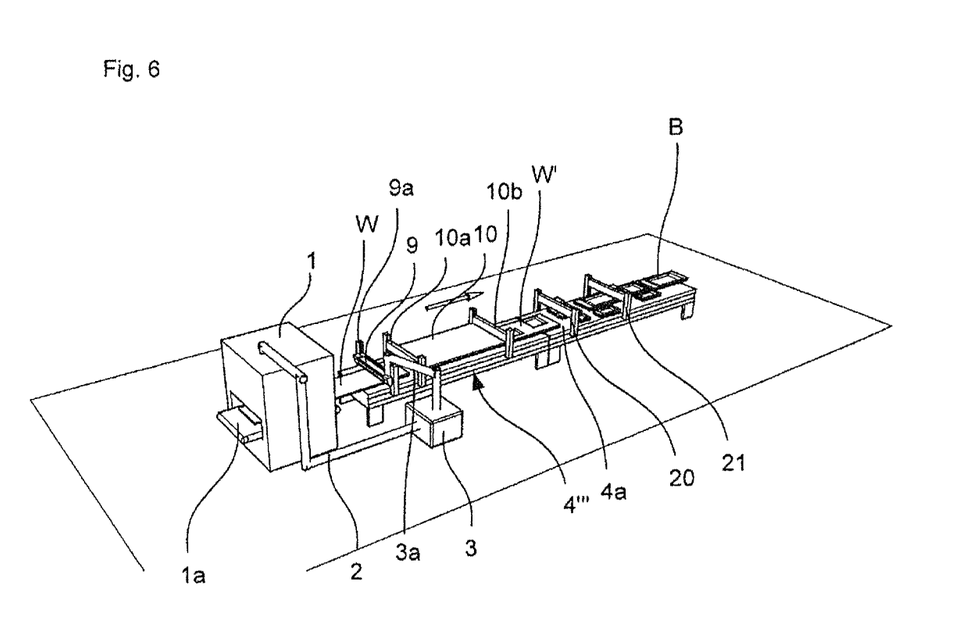
FIG. 6 is a perspective view, which shows a third embodiment of the present invention.

FIG. 6 is a perspective view of a production line, which comprises a sanding machine 1 and also a device for the forming of three-dimensional objects according to a third embodiment of the present invention. The direction of flow is indicated in FIG. 6 by means of an arrow.

To begin with, there is on the charging side of the production line a sanding machine 1, into which a workpiece W can be introduced by way of a conveyor belt 1a. The sanding machine 1 performs a sanding procedure on the top and/or bottom side of the workpiece W. During the abrasive procedure on the workpiece W sanding dust is produced, which is removed from the workpiece and from the sanding belt by way of a suction device.

In the direction of flow after the sanding machine 1 there is a device 4''' for the forming of three-dimensional objects, the workpiece-accommodating surface 4a of which, in particular a conveyor belt, runs in the same, horizontally aligned plane as the conveyor belt 1a of the sanding machine 1. The device 4 comprises an application unit 9 accommodated on an overarm 9a, which application unit—as described later in more detail—is utilised to form the three-dimensional objects, and also an embossing plate 10 held by means of overarms 10a, 10b in a portal construction and downstream postmachining stations 11a, 11b.

Even if the overarms 9a, 10a, 10b and postmachining stations 11a, 11b represented in the present embodiment are of portal construction, it is evident that these can also be constructed as jibs.

In FIG. 6 an extraction duct 2 is represented, which feeds the sanding dust drawn off by the suction device of the sanding machine 1 to a preparation unit 3 (storage device). In this connection the preparation unit 3 disposed next to the production line serves as temporary store for the sanding dust, and can comprise devices with which the sanding dust is prepared.

Details of such a preparation unit have already been explained as part of the description of the first embodiment. Therefore, to avoid repetitions, attention is drawn to the above explanations. In the present embodiment the sanding dust in the preparation unit is supplied to the application unit 9.

In the present embodiment the overarm 9a of the application unit 9 is of a portal construction and according to a modification of the third embodiment is movable along the conveying device (see arrow in FIG. 6). Application unit 9 is used to put the wood material, as material for the three-dimensional object, on a workpiece W that has been sanded in the sanding machine 1 and that serves as base. The application is carried out in lines across the entire width of the workpiece W. Thereupon the workpiece W', to which a three-dimensional structure has been added by means of the application unit 9, is moved in the direction of flow on a conveyor belt 4a of the device 4, and hereby reaches the area of the embossing plate 10. The embossing plate 10 is envisaged as being attachable in the device 4, and on the side facing the conveyor belt 4a has a negative pattern of a structure that is to be applied to workpiece W'.

The embossing plate 10 is accommodated in the vertical direction above the conveyor belt 4a on device 4, and is movable in the vertical direction. With the embossing plate 10 the workpiece W' can be processed in such a way that a three-dimensional structure is introduced into the workpiece W' with an appropriate form of the embossing plate 10 through the application of pressure, perhaps in combination with an input of heat, onto the side of the workpiece W' previously equipped with the wood material.

Subsequently the postmachining stations 20, 21 are envisaged in the conveying direction of the device, to separate structures introduced on the workpiece W' and thereby to cut out component parts B from the workpiece W'. Further postmachining steps can also be envisaged, to introduce radii, inclined surfaces, or free-form surfaces into the component parts B with a milling cutter.

To perform the said or any other work steps, the postmachining stations with portal construction comprise machining tools 20a, 20b. In the representation of the third embodiment of the present invention shown in FIG. 7 the postmachining stations 20, 21 comprise two chip-removing tools, in particular milling cutters. Owing to the envisaged redundant machining stations it is possible to machine large-area workpieces by means of both postmachining stations 20, 21 simultaneously or, alternatively, to provide different tools for machining of the workpieces W'. It is also possible for the machining station 20 disposed foremost in the direction of flow to bring about separation of the component parts from the workpiece W', while the further postmachining station 21 machines outside edges of the component parts that have been separated out.

Figure 7:
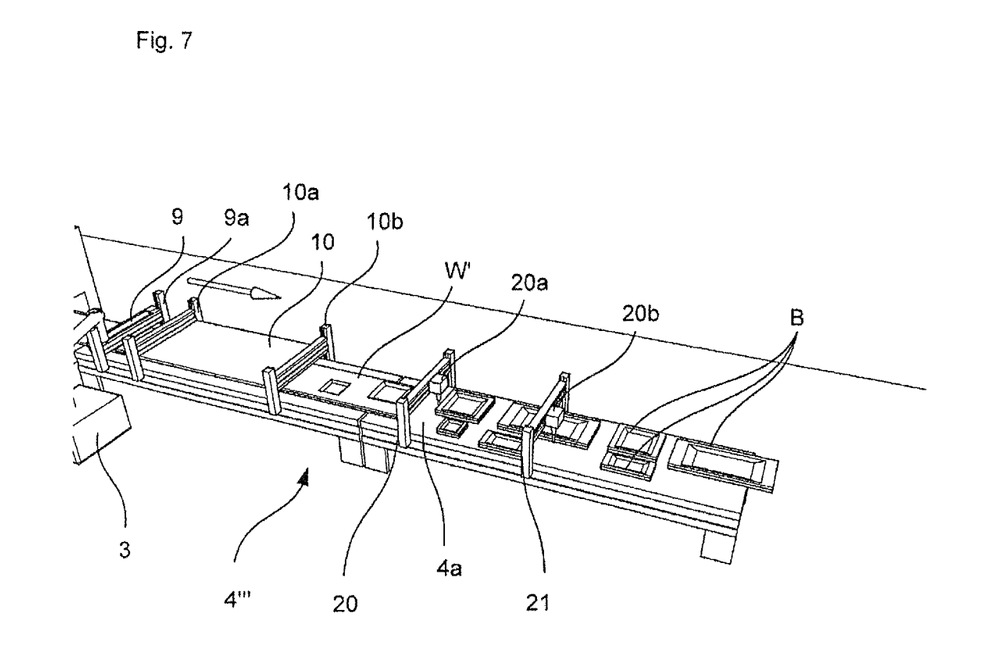
FIG. 7 is a further view of the third embodiment represented in FIG. 6.

In a modification of the described embodiment one of the postmachining stations 20, 21 is equipped with a machining tool in the form of an inkjet printing device, with which the previously formed structures on the component parts B, which may perhaps have been postmachined further, are given a final surface. This machining tool in the form of an inkjet printing device is envisaged with inkjet printing nozzles that can be swivelled and moved translationally, so the previously introduced contours can be printed variably or given a coat of paint or varnish.

An inkjet printing device is an ink printing device, from which drops of ink are ejected according to the drop-on-demand method. Such printing devices frequently make use of print heads that have piezoelectric elements or operate thermally.

In further modifications one or more other printing and coating devices can also be used, e.g. a laser printer, a thermal printer, or a coating application device.

Whilst it is envisaged in respect of the first embodiment (FIGS. 1-3) that two similar application units 12a, 12b are envisaged, it is possible, however, within the framework of a further variant of the first embodiment, for one of the application units to be charged with a material different from that charged into the other application unit. Purely by way of example it is mentioned that one of the application units can form a three-dimensional structure (component part B) on the workpiece W with a wood material, whereas a further application unit forms hinges or the like on the component part B or on the workpiece W.

Although a sanding machine 1 is envisaged on the charging side of a conveying line in the first and third embodiment, a machine with milling tools or other, chip-removing tools can also be envisaged. The chips produced during machining of the workpieces W are supplied to the preparation unit 3 in an appropriate way.

According to the second embodiment represented in FIG. 4 it can be envisaged that a further chip-removing tool is envisaged, which machines a starting workpiece. This thus machined workpiece is modified in a subsequent operation with the application unit 12c through the forming of a three-dimensional structure on this workpiece, which in the present case serves as base workpiece. Following this, postmachining can take place by means of the chip-removing tool 16 represented also in FIG. 4, so the machining tool 16 functions as postmachining station.

In a further modification of the represented devices 4-4''' a neighbouring tool magazine is envisaged, which accommodates machining tools. A nozzle of the application unit 9a, 12a-12c can also be accommodated by the tool changer and attached to this unit by means of a suitable device. In this way it is possible to modify the application unit according to the specific requirement.

It is also possible for the application unit itself to become replaceable, e.g. through being attached to a spindle device.

An application unit that can be attached in this way has furthermore means of transmission that can communicate with an interface of the relevant accommodating unit. In this way it is not necessary to connect the attachable application unit by means of cables, sliding contacts, hoses or similar. This simplifies the design radically. The means of transmission should be set up at least to receive data and/or energy and/or (wood) material from the means of transmission.

According to a further modification of the embodiments represented in FIGS. 1-7 it is envisaged, that, instead of a stationary preparation unit 3, a wood material store is envisaged in the area of the application unit 9, 12a-12c, which will accommodate wood material for specific machining steps. Thus connection of the application unit to a preparation unit is not necessary according to this modification.

In a further variant according to the present invention there is assigned to the application unit 9, 12a-12c a pretreatment module, with which a workpiece W, serving as base workpiece, is subjected to one or more pretreatment steps, which are selected from a precleaning, a degreasing, an improving of the adhesive and wetting properties and a reducing of the electrostatic charge. Within the framework of the precleaning it can be envisaged to remove some loose covering material on workpiece W and in this way to prepare the side of the workpiece W that is to be equipped with the three-dimensional object, so the material applied by the application unit 9, 12a-12c adheres well. In this way it is possible to manufacture workpieces with high durability and outstanding visual outward appearance.

In this connection, according to a further development, it can be envisaged, that the steps to be performed by the pretreatment module are selected in dependence on the section to be equipped with the three-dimensional object. Thus it is possible to perform individual pretreatment steps, which lead to an improvement in the workpiece quality in the specific situation that exists. The specific pretreatment steps can be selected manually or on the basis of an electronic scan of the surface of the relevant workpiece by a sensor, e.g. a photooptic sensor.

Even if the devices 4-4''' described within the framework of the aforementioned embodiments are constructed preferably as through-feed machines, in which workpieces are moved by means of a conveyor belt and are guided past the previously described units and devices, the present invention can also be used in what are known as stationary machines, in which the workpieces W or the component parts B are held by tool holders, while the described units and devices are moved in relation to them. Furthermore the present invention can be used on a machine, in which workpieces/component parts are conveyed stepwise. For this the workpiece is held for a machining operation, e.g. with an application unit or a machining tool, while the application unit or the machining tool is moved in relation to it, and thereupon the workpiece/component part is moved on further. This procedure can be repeated on the same workpiece/component part, or the workpiece can be conveyed out of the said position.

The invention claimed is:

1. A device for forming three-dimensional objects comprising:
    a machine for machining of a workpiece by material removal,
    a supply mechanism for supplying material machined from the workpiece by the machine to the workpiece after machining selected from the group consisting of wood material, such as foamed wood, wood flour, sawdust, metal and mineral paste, and plastic,
    a suction device which collects material produced from the machine and supplying it to a storage device
    wherein the storage device is connected to the supply mechanism and accommodates the material,
    an application unit for forming three-dimensional objects on the workpiece from the material supplied by the supply mechanism, wherein the application unit comprises a nozzle, and
    a machining tool for further machining of the three-dimensional objects on the workpiece.

2. The device according to claim 1, wherein the machine is selected from the group consisting of a sanding machine and a milling machine.

3. The device according to claim 1 further comprising a coating device with which workpieces and/or shapes formed by use of the application unit can be printed on or varnished.

4. The device according to claim 1, further comprising a finishing unit selected from the group consisting of a heating device, a UV radiator, a device for edge-banding, extruding, and coating, laminating, cleaning, degreasing, improving the adhesive and wetting properties, and reducing the electrostatic charge.

5. The device according to claim 1, wherein the application unit further comprises a pretreatment module with which a workpiece serving as a base workpiece is subjected to one or more pretreatment steps, wherein the pretreatment module comprises one or more modules which are selected from the group consisting of a precleaning module, a degreasing module, a module to improve the adhesive and wetting properties, and a module to reduce the electric charge.

6. The device according to claim 1, further comprising an embossing plate with which the three-dimensional object formed by the application unit is provided with a structure.

7. The device according to claim 1, wherein the application unit can be moved along a guide horizontally and vertically.

8. The device according to claim 1, characterised in that the application unit comprises a storage facility which accommodates the additional material that is to be processed.

9. The device according to claim 1, characterised in that the application unit is attached to a tool holder.

10. The device according to claim 7, characterised in that the machine and the application unit are fitted on a shared carriage, which can be moved along the guide.

11. The device of claim 3 wherein the coating device comprises an inkjet printing device.

12. The device of claim 9 wherein the tool holder comprises a tool magazine.

* * * * *